(12) United States Patent
Brockett et al.

(10) Patent No.: US 6,623,217 B2
(45) Date of Patent: Sep. 23, 2003

(54) INDEXABLE TURNING INSERT

(75) Inventors: Brendan L. Brockett, Dearborn Heights, MI (US); Thomas J. Bernadic, Madison Heights, MI (US)

(73) Assignee: Valenite, Inc., Madison Heights, MI (US)

(*) Notice: Subject to any disclaimer, the term of this patent is extended or adjusted under 35 U.S.C. 154(b) by 0 days.

(21) Appl. No.: 09/961,551

(22) Filed: Sep. 24, 2001

(65) Prior Publication Data

US 2003/0059265 A1 Mar. 27, 2003

(51) Int. Cl.⁷ .................. B23B 27/22; B23P 15/28
(52) U.S. Cl. ................................ 407/114; 407/116
(58) Field of Search ............................ 407/113, 114, 407/115, 116

(56) References Cited

U.S. PATENT DOCUMENTS

| | | |
|---|---|---|
| 4,572,042 A | 2/1986 | Wiman |
| 4,681,488 A | 7/1987 | Markusson |
| 5,199,827 A | 4/1993 | Pantzar |
| 5,226,761 A | 7/1993 | Satran et al. |
| 5,246,315 A | 9/1993 | Hansson et al. |
| 5,388,932 A | 2/1995 | DeRoche et al. |
| 5,634,745 A | 6/1997 | Wiman et al. |
| 5,771,763 A | 6/1998 | Näslund et al. |
| 5,904,450 A | 5/1999 | Satran et al. |
| 5,915,889 A * | 6/1999 | Kress et al. ............... 407/114 |
| 5,971,672 A | 10/1999 | Hansson |
| 6,050,751 A * | 4/2000 | Hellstrom ................. 407/103 |
| 6,074,137 A * | 6/2000 | Betman et al. ............ 407/103 |
| 6,196,770 B1 | 3/2001 | Aström et al. |
| 6,217,263 B1 | 4/2001 | Wiman et al. |
| 6,238,147 B1 | 5/2001 | Tägström et al. |
| 6,244,791 B1 | 6/2001 | Wiman et al. |

FOREIGN PATENT DOCUMENTS

| | | | | |
|---|---|---|---|---|
| WO | WO 95/00272 | * | 1/1985 | .......... 407/113 |

* cited by examiner

*Primary Examiner*—Henry W. H. Tsai
(74) *Attorney, Agent, or Firm*—Burns, Doane, Swecker & Mathis, LLP

(57) ABSTRACT

An indexable turning insert has main upper and lower surfaces of polygonal shape joined by side surfaces. Insert corners are defined by the intersection of insert sides at each corner of the polygonal surfaces, insert corners having a curve of relatively small radius defining the nose of the corner. The inserts are at least partially symmetrical and have a plurality of identical cutting edges. Adjacent the corner nose of an identical cutting edge are wiping surfaces comprising at least one curved segment joining the insert corner radius and defined by a radius larger than the corner radius and at least one flat segment intersecting the insert side at a shallow angle.

17 Claims, 3 Drawing Sheets

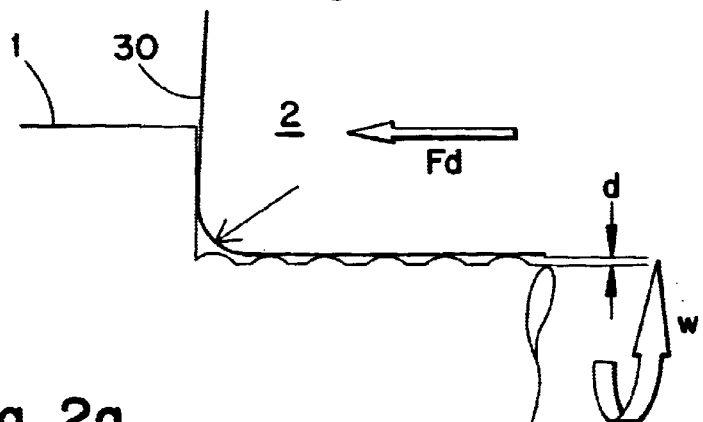
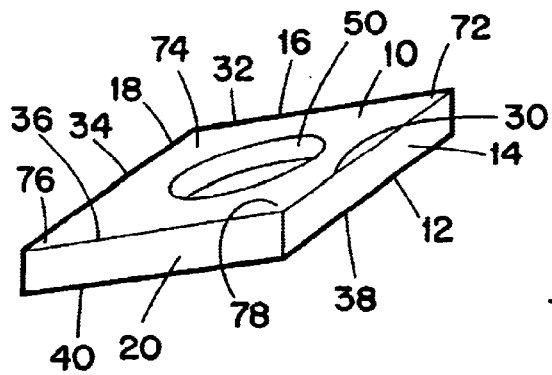
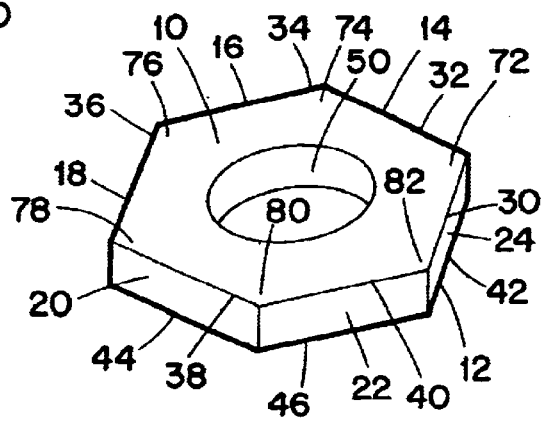
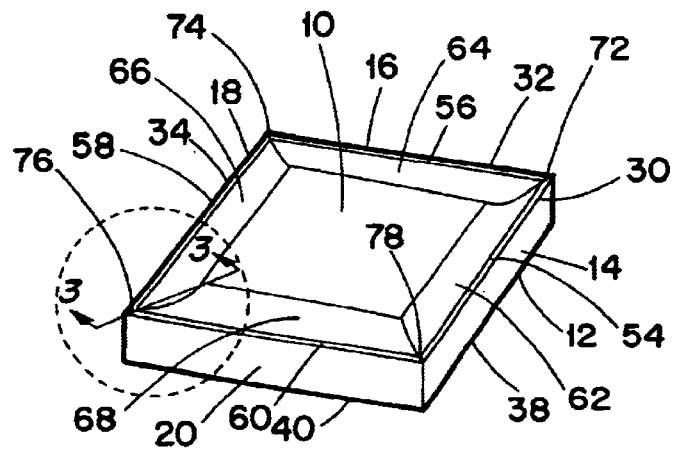

INDEXABLE TURNING INSERT

BACKGROUND OF THE INVENTION

I. Field of the Invention

This invention relates to indexable inserts for cutting tools, i.e. cutting inserts having plural cutting edges and suitable for mounting in plural orientations in cutting tools such that in each orientation one or more cutting edges are exposed for use. In particular, this invention relates to indexable inserts for turning operations.

II. Description of Related Art

Indexable inserts of interest herein have top and bottom surfaces of polygonal shape joined by side surfaces, intersections of at least portions of the side surfaces with the polygonal surfaces defining cutting edges of the insert. In general, turning operations are performed so that cutting occurs at an insert corner formed by intersections of sides at corners of a polygonal surface, the insert corner being traversed along a workpiece surface as the workpiece rotates. As is well known, turning operations performed in this way, cause the workpiece surface to be grooved as illustrated in FIG. 1. In applications where the surface roughness presented by such grooves is unacceptable, additional machining operations, such as grinding, must be performed to reduce or eliminate the surface roughness. The insert corners at which such cutting is performed are curved, rather than sharp, the corner radius providing resistance of the corner to chipping and breaking under load. It is also known that for a particular insert style and size applied at particular turning parameters, the larger the corner radius the smaller the depths of grooves in the workpiece surface. Nevertheless, some applications require that the corner radius be kept small, such as those requiring relatively sharp corners in workpiece surfaces. Hence, there remain conflicting demands for turning tools, i.e., the need to produce surfaces with little or no grooving and the need to maintain small corner radii to accurately produce workpiece features requiring relatively sharp corners.

In recent years, turning inserts have been made available to address conflicting demands of improved surface finish and relatively small corner radii for indexable turning inserts. In these inserts, corner radii are kept small and adjacent the corner radii there are provided side segments intended to increase the contact area of the insert with the workpiece to reduce the magnitude of grooves. Turning inserts are now known that provide curved segments adjacent the corner radius wherein the radii of the curved segments are larger than the corner radius. It is also now known to provide indexable turning inserts wherein flat segments are interposed between the corner radius and the sides, the flat segment blending smoothly with the curved corner and intersecting the side at a shallow angle. These segments, whether curved or flat, have become known as "wipers", for their effect on reducing the magnitude of grooves produced by the insert as compared to performance of cutting inserts lacking such segments. While known wipers have achieved improved cutting performance, the desire for increased material removal rates from cutting tools has led to the need for further performance improvements.

SUMMARY OF THE INVENTION

It is an object of the present invention to provide indexable turning inserts having relatively small corner radii and plural segment wipers adjacent the corners It is a further object of the present invention to provide an indexable turning insert having relatively small corner radii and wipers comprising a curved segment of relatively large radius adjacent the corner and a flat segment adjacent the curved segment and intersecting the insert side at a shallow angle.

Further objects and advantages of the invention shall be made apparent from the accompanying drawings and the following description thereof.

In accordance with the aforesaid objects the present invention provides an indexable turning insert having main upper and lower surfaces of polygonal shape joined by side surfaces. Insert corners are defined by the intersection of insert sides at each corner of the polygonal surfaces, insert corners having a curve of relatively small radius defining the nose of the corner. Adjacent the corner nose are wipers of plural segments, including at least one curved segment joining the corner radius and defined by a radius larger than the corner radius and at least one flat segment intersecting the insert side at a shallow angle.

BRIEF DESCRIPTION OF THE DRAWINGS

FIG. 1 is an enlarged view of contact between a turning insert and workpiece

FIGS. 2a–2c illustrate known styles of turning indexable inserts

DETAILED DESCRIPTION OF THE PREFERRED EMBODIMENT

Figure 3:
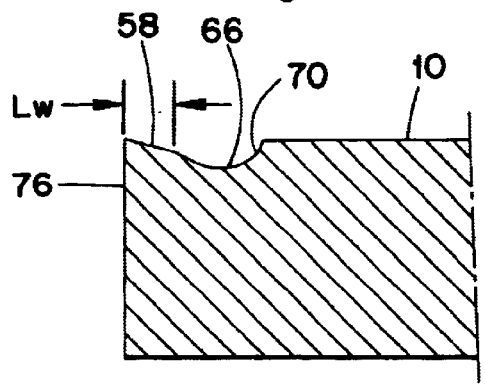
FIG. 3 is a cross-sectional view of an insert corner of FIG. 1c.

In turning, cutting occurs proximate an exposed corner of a cutting insert, with the insert nose being the forward most portion of the insert relative to the workpiece as illustrated by workpiece 1 and insert 2 of FIG. 1. Relative motion of insert 1 and workpiece 2 is produced by feed, indicated by arrow Fd, and workpiece rotation, indicated by arrow w. As depicted with exaggeration in FIG. 1, the surface of workpiece 100 behind the nose of the insert is grooved, the grooves defining roughness in the workpiece surface measured by linear depth "d" of the grooves. The grooves are produced as a result of the combination of feed and rotation and the limited contact area of the insert nose with the workpiece surface behind the leading cutting edge (edge 30 of FIG. 1).

Referring to FIGS. 2a–2c, known styles of turning inserts include diamond shape (FIG. 2a), hexagonal (FIG. 2b), and rhomboidal (FIG. 2c). Common features of the inserts are designated by the same reference numbers in each of FIGS. 2a–2c. Inserts depicted in FIGS. 2a and 2b include mounting holes 50 for fixing the inserts to holders by, for example threaded fasteners. Mounting holes 50 may include mating surfaces for particular fasteners as are known in the art. Upper and lower surfaces 10 and 12 are of polygonal shape and are joined by sides 14 through 24 (sides 22 and 24 are shown only in FIG. 2b). Sides 14 through 24 are perpendicular to upper and lower surfaces 10 and 12. Insert corners 72–82 (corners 80 and 82 appear only in FIG. 2b) are formed at the intersections of sides at corners of upper and lower surfaces 10 and 12. At least the insert corners wherein the included angle of the corner of the polygonal surface is acute include a curved segment centered on the corner bisector, the curved segment comprising the nose of the insert corner.

Continuing with reference to FIGS. 2a–2c, cutting edges 30 through 46 (cutting edges 40–46 are shown only in FIG. 2b) are formed at the intersection of, at least, portions of sides 14 through 24 with upper and/or lower surfaces 10 and 12. Inserts provided with cutting edges at both upper and lower surfaces 10 and 12 may be mounted to expose selected ones of such cutting edges. Polygonal inserts are generally at least partially symmetrical to provide plural identical cutting edges exposable for use in particular orientations of the insert in a holder. All cutting edges of fully symmetrical inserts may be identical. Inserts which are at least partially symmetrical are referred to as "indexable" inserts in that a single insert may be rotated or "indexed" to present selected of identical cutting edges for use as mounted in a holder. Thus, insert shapes depicted in FIGS. 2a and 2c may have as many as eight identical cutting edges while inserts shaped as depicted in FIG. 2b may have as many as twelve identical cutting edges.

Continuing with reference to FIG. 2c, inward from the cutting edges are lands, such as lands 54–60. Lands 54–60 are typically planar, of width Lw (FIG. 3) and slope away from the plane of upper surface 10 inwardly of cutting edges 30–36 at a shallow angle providing relief at the rake face of the insert, i.e. a gap between the rake face and the workpiece inwards of the cutting edge. Adjacent to lands 54–60 are chip control grooves 62–68 which slope gradually away from the plane of upper surface 10. As seen in FIG. 3 (sectional view of insert corner 76 along line 3—3), the floor of groove 66 joins a chip control wall 70 that intersects upper surface 10. Grooves 62–68 and the associated chip control walls may be uninterrupted as illustrated in FIG. 2c or may include projections and recesses (not shown), along at least a portion of a cutting edge, intended to assist in the formation of and breaking of chips during machining, as is well known. Further, chip control grooves 62–68 and chip control wall 70 may include portions or segments having curved and planar surface segments designed to improve formation and guidance of chips away from the workpiece.

Figure 4:
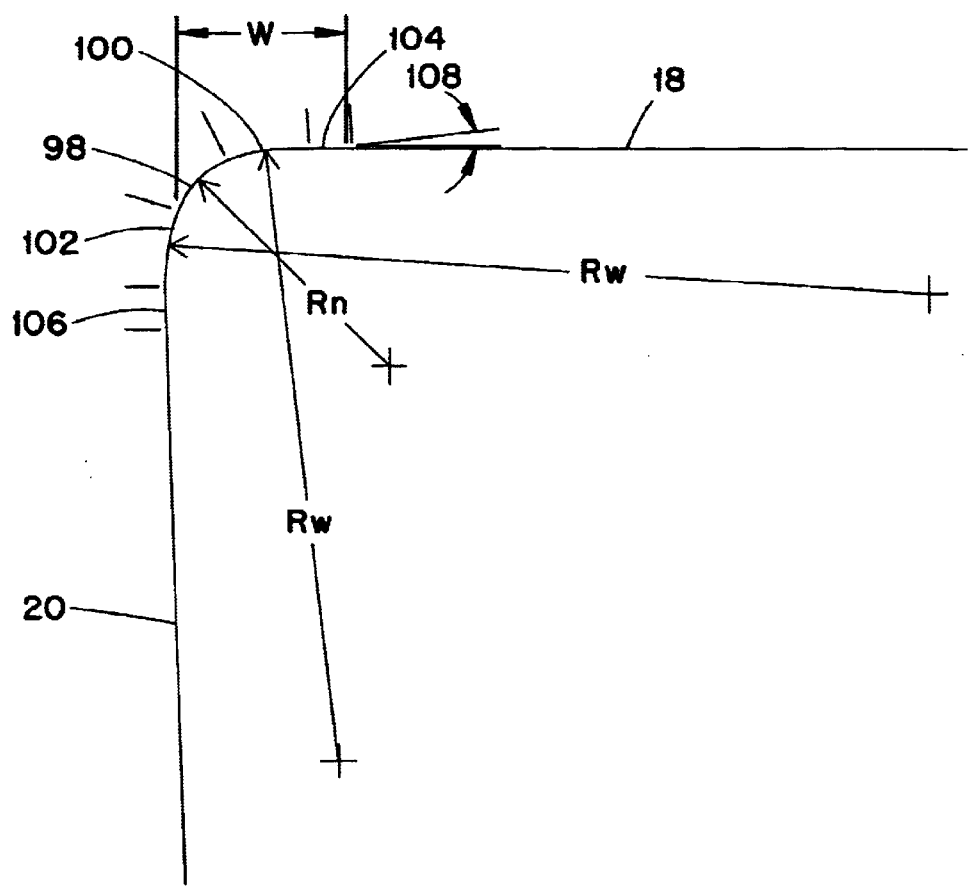
FIG. 4 is an enlarged view of a corner nose and wiper of an insert in accordance with the invention.

As noted with reference to FIG. 1, known turning inserts produce grooves in the workpiece surface as a function of the limited contact area of the insert and workpiece, and the combination of feed and workpiece rotation. To increase the contact area, while simultaneously maintaining a relatively small insert corner radius, wiping surfaces, or "wipers" are added to the insert sides adjacent the nose. Known wiping surfaces may be curved or flat segments blending with the nose and the insert side. In accordance with the present invention, wipers are added which comprise a curved segment of relatively large radius and a flat. With reference to FIG. 4, a top view of a corner such as corner 76 of FIG. 1c is shown greatly enlarged. While nose 98 of FIG. 4 is subtended by a first and second wiping surface, it is to be understood that in some insert configurations only a single wiping surface may subtend a nose.

Continuing with reference to FIG. 4, nose 98 of radius Rn is joined by curved segments 100 and 102, the radii Rw of the curved segments being a multiple of the radius Rn of the nose and as shown, being equal each to the other. The curved segments each join the nose radius and extend away therefrom along the sides subtending the nose. Flat segments 104 and 106 are interposed between curved segments 100 and 102, and sides 18 and 20, respectively. From FIG. 4 it is seen that the terminus of each curved segment most distant from the nose is inset from the extension of the side at the curve terminus. Each flat spans a portion of the wiper from the terminus of the curved segment to the side, intersecting the associated side at a shallow angle of inclination 108 in the range of 2 to 4 degrees.

Applicants have determined that wipers in accordance with the invention provide improved cutting performance as compared to known wipers comprising only curved or flat segments alone as illustrated by the data of Tables 1–4. In Tables 1–4, "Wiper Width" corresponds to the dimension "W" illustrated in FIG. 4, as applied to the overall extent of the wiper segments of each insert tested; surface finish corresponds to the depth "d" of grooves illustrated in FIG. 1; and nose radius corresponds to the radius Rn illustrated in FIG. 4. Indexable turning inserts of the stated characteristics were used in turning tests of workpieces made of 1045 steel at a surface speed of 600 surface feet per minute at various depths of cut (DOC) and over a range of feedrates (inches per revolution "IPR").

TABLE 1

(DOC = 0.150)

| Insert # | Nose Radius "Rn" | Wiper Radius | Wiper Flat | Wiper Width "W" | Feed IPR | Surface Finish (m) min. | Surface Finish (m) max. |
|---|---|---|---|---|---|---|---|
| 1 | 0.028 | 0.225 | No | 0.052 | 0.007–0.027 | 1.0 | 2.5 |
| 2 | 0.031 | — | Yes | 0.060 | 0.007–0.027 | 0.8 | 2.4 |
| 3 | 0.031 | 0.400 | No | 0.058 | 0.007–0.027 | 0.8 | 2.1 |
| 4 | 0.028 | 0.182 | Yes | 0.058 | 0.007–0.027 | 1.0 | 2.4 |

TABLE 2

(DOC = 0.100)

| Insert # | Nose Radius "Rn" | Wiper Radius | Wiper Flat | Wiper Width "W" | Feed IPR | Surface Finish (m) min. | Surface Finish (m) max. |
|---|---|---|---|---|---|---|---|
| 1 | 0.028 | 0.225 | No | 0.052 | 0.007–0.027 | 1.0 | 3.0 |
| 2 | 0.031 | — | Yes | 0.060 | 0.007–0.027 | 1.4 | 3.2 |
| 3 | 0.031 | 0.400 | No | 0.058 | 0.007–0.027 | 0.9 | 2.7 |
| 4 | 0.028 | 0.182 | Yes | 0.058 | 0.007–0.027 | 1.3 | 2.9 |

TABLE 3

(DOC = 0.050)

| Insert # | Nose Radius "Rn" | Wiper Radius | Wiper Flat | Wiper Width "W" | Feed IPR | Surface Finish (m) min. | Surface Finish (m) max. |
|---|---|---|---|---|---|---|---|
| 1 | 0.028 | 0.225 | No | 0.052 | 0.007–0.027 | 1.2 | 3.0 |
| 2 | 0.031 | — | Yes | 0.060 | 0.007–0.027 | 1.2 | 4.0 |
| 3 | 0.031 | 0.400 | No | 0.058 | 0.007–0.027 | 1.0 | 2.5 |
| 4 | 0.028 | 0.182 | Yes | 0.058 | 0.007–0.027 | 1.3 | 2.1 |

TABLE 4

(DOC = 0.025)

| Insert # | Nose Radius "Rn" | Wiper Radius | Wiper Flat | Wiper Width "W" | Feed IPR | Surface Finish (m) min. | Surface Finish (m) max. |
|---|---|---|---|---|---|---|---|
| 1 | 0.028 | 0.225 | No | 0.052 | 0.007–0.027 | 1.0 | 2.8 |
| 2 | 0.031 | — | Yes | 0.060 | 0.007–0.027 | 1.5 | 4.0 |
| 3 | 0.031 | 0.400 | No | 0.058 | 0.007–0.027 | 0.7 | 3.1 |
| 4 | 0.028 | 0.182 | Yes | 0.058 | 0.007–0.027 | 1.7 | 2.3 |

Figure 5:
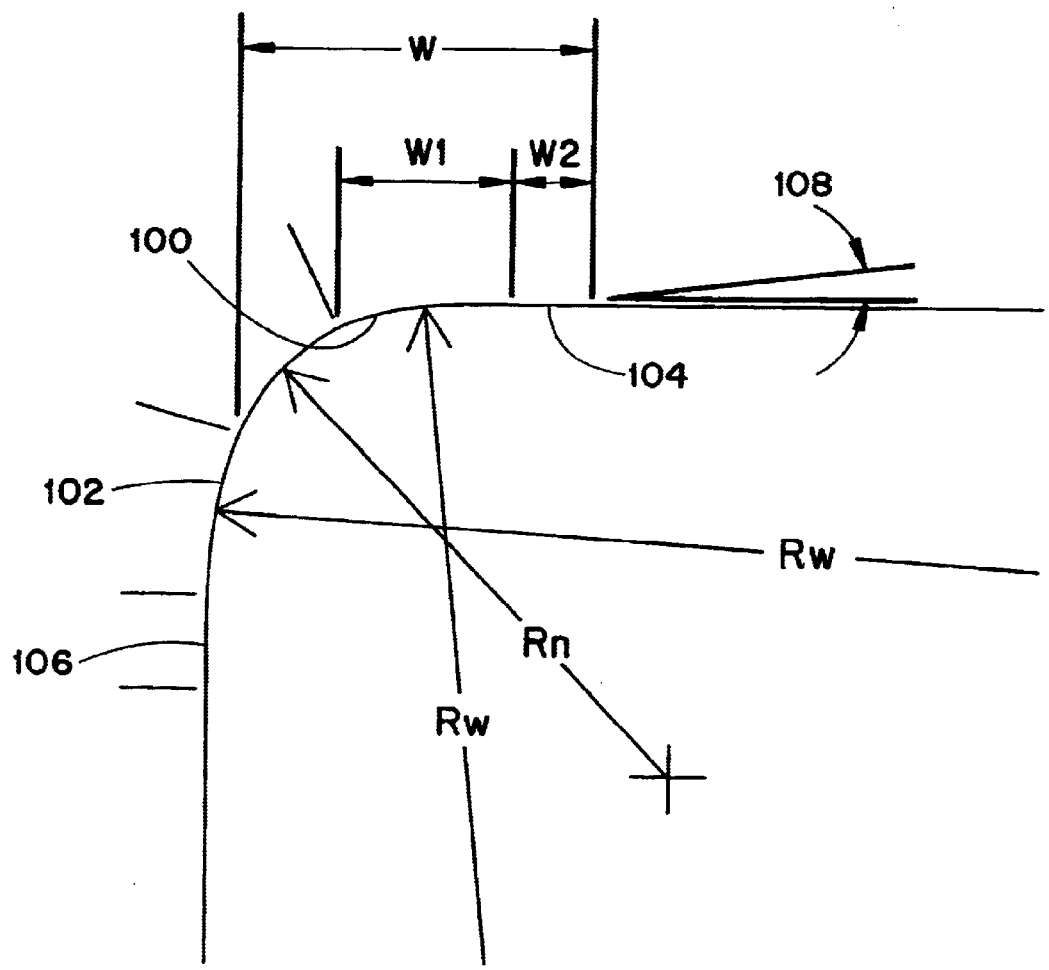
FIG. 5 is an enlarged fragmentary view of FIG. 4.

From the data of Tables 1–4, it is seen that insert #4, having a wiper comprising a curved segment and a flat segment in accordance with the invention, produces the best overall performance throughout the range of cutting test depths of cut (DOG). Further, is seen from the data of Tables 1–4 that the wiper in accordance with the invention maintains a relatively small nose radius while providing a relatively large overall wiper width. A portion W1 of the wiping width W defined by the curved segment 100 (or 102) is larger than a portion W2 thereof formed by the flat segment 104 (or 106), as shown in FIGS. 4 and 5.

While the invention has been described with reference to the preferred embodiment and the details thereof, it is not the intention of the applicants to limit their invention to such details. Rather, it is the intention of applicants that their invention be defined by the breadth and scope of the appended claims and all equivalents thereof.

What is claimed is:

1. An indexable turning insert having an upper surface and lower surface of polygonal shape joined by sides substantially perpendicular to the upper and lower surfaces, the intersection of the sides and at least one of the upper and lower surfaces defining cutting edges, and the intersections of sides at corners defined by the polygonal shape of the upper and lower surfaces defining insert corners, the insert comprising a plurality of identical cutting edges, an insert corner comprising a nose associated with an identical cutting edge, and a side associated with an identical cutting edge comprising a first wiper adjacent the nose, the first wiper comprising a curved segment and a flat segment, the curved segment having a radius of curvature larger than the radius of curvature of the nose, joined with the nose radius, and having a terminus most distant from the nose inset from the extension of the side forming the identical cutting edge, the flat segment extending from the curved segment toward the insert side and intersecting the insert side at a shallow angle.

2. The indexable insert of claim 1 wherein the polygonal shape is rhomboidal.

3. The indexable insert of claim 2 wherein a second identical cutting edge is associated with the insert corner comprising the nose, the second identical cutting edge having a second wiper with a second curved segment of radius equal to the radius of the first curved segment, the second curved segment joining the nose radius and extending to a terminus inset from the extension of the side forming the second identical cutting edge and a second flat segment extending from the terminus of the second curved segment most distant from the nose and intersecting the insert at a shallow angle identical to the shallow angle formed by the flat segment of the first wiper.

4. The indexable insert of claim 3 wherein the rhomboidal shape defines at least two insert corners having acute included angles, each such insert corner comprising a nose portion subtended by said first and second wipers.

5. The indexable insert of claim 1 wherein the polygonal shape is a diamond.

6. The indexable insert of claim 1 wherein the polygonal shape is hexagonal.

7. The indexable insert of claim 1 further comprising a land adjacent each identical cutting edge and inclined at a shallow angle away from the polygonal surface of the cutting edge and inward of the associated identical cutting edge.

8. The indexable insert of claim 1 further comprising a chip control groove inward of each identical cutting edge, the chip control groove sloping shallowly away from the polygonal surface of the cutting edge and inward of the associated cutting edge.

9. The indexable insert of claim 6 further comprising a chip control wall rising from the floor of the chip control groove and intersecting the polygonal surface of the cutting edge inward of the chip control groove.

10. The indexable insert of claim 9 wherein the polygonal shape is rhomboidal.

11. The indexable insert of claim 10 wherein a second identical cutting edge is associated with the insert corner comprising the nose, the second identical cutting edge having a wiper with a second curved segment of radius equal to the radius of the first curved segment joining the nose radius and extending to a terminus inset from the extension of the side forming the second identical cutting edge and a second flat segment extending from the terminus of the second curved segment most distant from the nose and intersecting the insert side at a shallow angle identical to the shallow angle formed by the first flat segment.

12. The indexable insert of claim 11 wherein the rhomboidal shape defines at least two insert corners having acute included angles, each such insert corner comprising a nose portion subtended by said first and second wipers.

13. The indexable insert of claim 9 wherein the polygonal shape is a diamond.

14. The indexable insert of claim 9 wherein the polygonal shape is hexagonal.

15. The indexable cutting insert according to claim 1 wherein the shallow angle is in the range of 2–4 degrees.

16. The indexable cutting insert according to claim 3 wherein the shallow angles are in the range of 2–4 degrees.

17. The indexable cutting insert according to claim 1 wherein the wiper defines a wiping width, a portion of the wiping width defined by the curved segment being larger than a portion of the wiping width defined by the flat segment.

* * * * *